United States Patent
Grignol

[11] Patent Number: 5,858,574
[45] Date of Patent: Jan. 12, 1999

[54] CELLS AND GAS DEPOLARIZED BATTERIES AND METHOD FOR PRODUCING SAME

[75] Inventor: Tanya R. Grignol, Los Gatos, Calif.

[73] Assignee: Space Systems/Loral, Inc., Palo Alto, Calif.

[21] Appl. No.: 900,599

[22] Filed: Jul. 25, 1997

[51] Int. Cl.$^6$ .................................................. H01M 6/648
[52] U.S. Cl. ........................... 429/210; 429/154; 429/155
[58] Field of Search .................................... 429/157, 210, 429/154, 155, 152, 153, 164

[56] References Cited

U.S. PATENT DOCUMENTS

| | | | |
|---|---|---|---|
| 4,877,694 | 10/1989 | Solomon et al. | 429/27 |
| 5,652,073 | 7/1997 | Lenhart et al. | 429/210 |
| 5,752,987 | 5/1998 | Yang | 29/623.1 |

Primary Examiner—Maria Nuzzolillo
Assistant Examiner—Jonathan Crepeau
Attorney, Agent, or Firm—Perman & Green, LLP

[57] ABSTRACT

A bipolar rechargeable battery comprises a vessel with an insulated liner and an interior region for bulk storage of a gas which serves as an electrode active material. A plurality of cells are nested within the vessel, each including a metallic bipolar plate having a circular base and an integral insulated hydrophobic upstanding side wall of truncated conical shape diverging with increased distance from the base. The essential novelty of the present batteries resides in the application of a hydrophobic insulating coating of a chlorotrifluoro olefin polymer, preferably a copolymer of ethylene and chlorotrifluoro ethylene, over the interior and exterior surfaces of the conical side wall of each bipolar plate.

13 Claims, 2 Drawing Sheets

CELLS AND GAS DEPOLARIZED BATTERIES AND METHOD FOR PRODUCING SAME

BACKGROUND OF THE INVENTION

1. Field of the Invention

The present invention relates to improved bipolar cells and gas depolarized rechargeable batteries, such as nickel hydrogen and zinc oxygen, containing such cells, and to methods for producing such batteries.

2. Discussion of the Prior Art

A requirement of bipolar batteries is the need for an electrolyte seal between individual cells to prevent short circuits. This requirement is complicated in batteries with a gas phase active material since communication between each cell and a common gas storage space must be provided. Thus both a liquid seal and a gas vent are required.

An additional problem with these batteries is that means must be found to prevent gas phase water transfer between cells either as water vapor or as a result of parasitic reactions which generate oxygen in the case of a nickel hydrogen battery or hydrogen in the case of a zinc oxygen battery. If the parasitic gases are transported to the bulk vapor space then they may preferentially recombine with the depolarizing gas in those cells closest to the gas space. For example, $O_2$ generated during nickel electrode overcharge in a nickel hydrogen cell may react with hydrogen within the cell or be transported out of the cell and react in the gas storage vessel or in another electrode. $O_2$ lost from the cell may be converted to $H_2O$ in other cells or other parts of the battery. This leads to "dry out" and failure of the cell from which $O_2$ is lost.

Bipolar cells and rechargeable batteries containing same are disclosed in commonly assigned U.S. application for patent, Ser. No. 08/626,992 filed Apr. 3, 1996, titled, "Bipolar Design for a Gas Depolarized Battery". A plurality of cells are suitably mounted within a pressure vessel, specifically within a central cylinder in a nested relationship. Each cell contains a metered predetermined quantity of electrolyte and includes a metallic bipolar cup having a base and an integral upstanding side wall encompassing the base. The upstanding side wall preferably is of truncated conical shape diverging with increased distance from the base, although other shapes may be utilized including the side wall being substantially coplanar with the base. An insulating material covers the upstanding side wall.

The metallic bipolar cup may be fabricated from a variety of materials including nickel, aluminum plated with nickel, stainless steel, metallic coated graphite composite and titanium. The side wall coating of insulating material is a hydrophobic fluorocarbon polymer such as TEFLON® (polytetrafluoroethylene).

The hydrophobic insulating coating plays a critical role in achieving optimum battery performance and life. This coating must be resistant to separation or delamination from the inside and outside walls of the metallic cup when exposed to the highly alkaline electrolyte solution and the severe electrochemical and thermal environment typical of the interior of a bipolar battery, particularly during operation in gravity-free outer space. This is essential in order to prevent electrolyte sharing between adjacent battery cells and to isolate or insulate adjacent cells electrically.

While TEFLON® represented a preferred hydrophobic insulating coating material, it delaminates from the walls of the cup after a relatively short period of time upon exposure to the strong alkaline electrolyte solution and severe electrochemical and thermal environment within the bipolar battery. Even when a primer coating is applied to the metal cup, prior to the application of the TEFLON® coating, the electrolyte attacks the interface of the metal and the primer and lifts the coating off.

Attempts to improve the bonding of the TEFLON® coating to the opposed surfaces of the annular outer cup wall by perforating the wall and heat-bonding opposed layers of the TEFLON® through the perforations were unsuccessful. The TEFLON® bonded tightly to itself, through the perforations, but did not bond to the metal in other areas. Also, a difference in the coefficient of expansion between the metal and the TEFLON® layer causes the TEFLON® layer to shrink tightly against the outer cup wall and to shrink away from the inner cup wall, causing distortion of the shape of the cup and leakage of the electrolyte.

It is the objective of the present invention to overcome the aforementioned disadvantages and limitations of the prior art by providing a hydrophobic insulation coating which has excellent affinity and retention properties for the metallic cell cups or dishes used in a bipolar battery. Such a coating must adhere to the metallic dish even after extended periods of exposure to the highly alkaline electrolyte and the severe electrochemical and thermal environment typical of that inside a spacecraft battery, without the need for a primer coating or perforations.

SUMMARY OF THE INVENTION

The present invention relates to the discovery of novel hydrophobic insulating coatings for the outer peripheral tapered wall and rim areas of each bipolar cell cup stacked or nested within the central cylinder of a pressurized bipolar battery. The present hydrophobic insulating coatings comprise polymers of chlorotrifluoro olefin monomers, which have excellent affinity and retention properties for the interior and exterior wall surfaces of the metallic bipolar cups so as to provide a long-lasting inner and outer insulation seal against the migration or leakage of the liquid electrolyte from one bipolar cup to another during use where it is subjected to contact with the highly alkaline electrolyte (KOH, pH 14+) and to electrochemical and thermal stresses within the battery.

The preferred insulating coatings comprise poly(ethylene-cochlorotrifluoroethylene) copolymers suspended in a volatile vehicle and containing a filler such as mica. The suspension is sprayed onto the inner and outer walls of the bipolar metal dishes or cups and is cured at elevated temperature to produce a durable, electrically-insulating layer.

DETAILED DESCRIPTION OF THE PREFERRED EMBODIMENT

Figure 1:
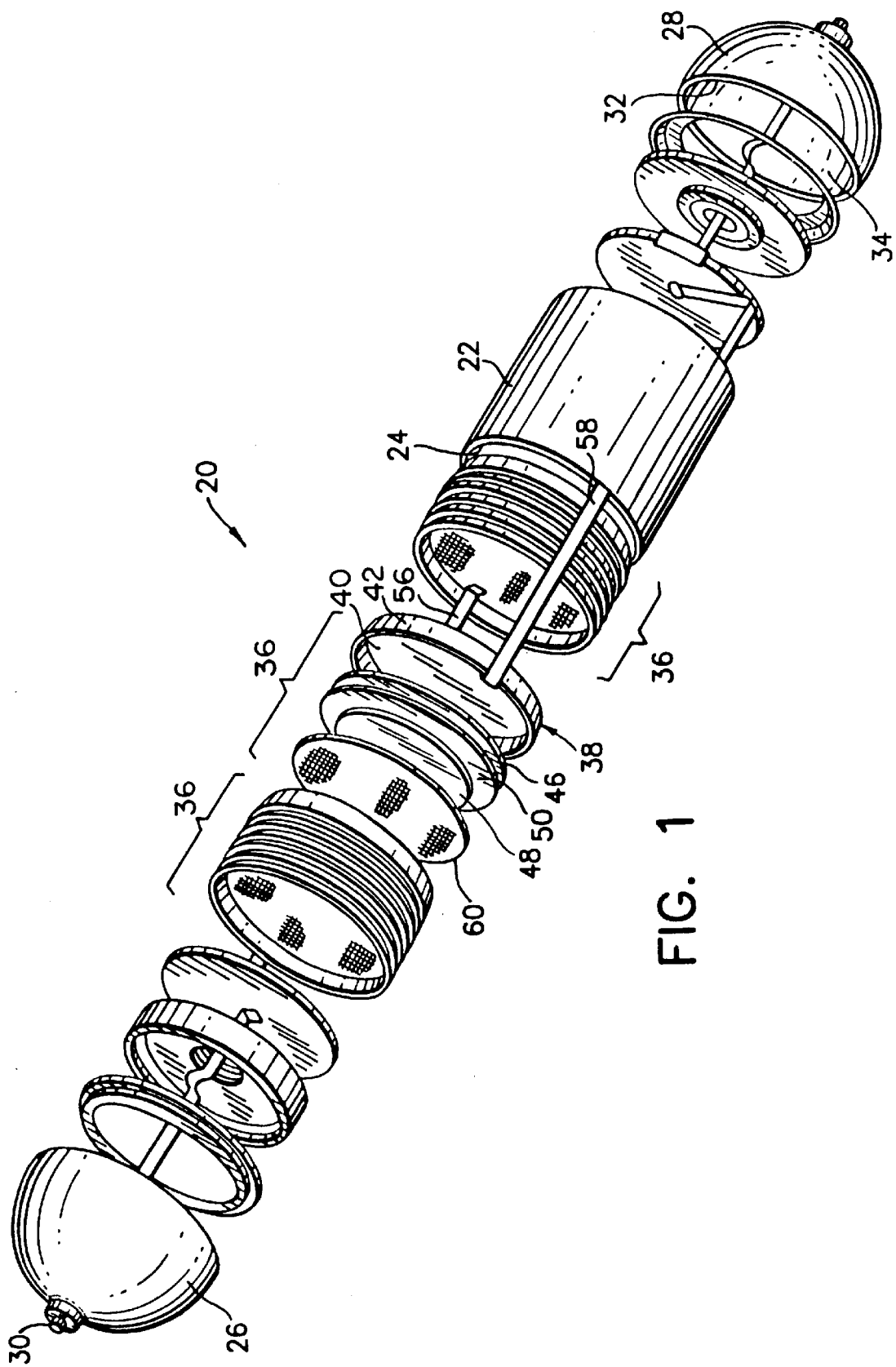
FIG. 1 is a perspective exploded view of a battery embodying the present invention.

FIG. 1 illustrates in exploded fashion a bipolar rechargeable battery 20 embodying the present invention. The battery 20 may be, for example, of the bipolar nickel hydrogen variety. A vessel for the battery is defined by a central cylinder 22 which may be coated with a TEFLON® liner 24, shown in FIG. 2, and opposed by possibly spherical end caps 26, 28 which may be drawn together into firm engagement with opposed end rims of the central cylinder by means of a suitable fastener. Together, the central cylinder 22 and the end caps 26, 28, having terminal 30, provide an inner surface 32 defining an interior region 34 for bulk gas storage as will be described. With this construction, the battery 20 is capable of withstanding such pressures as are generated by the contained gases.

Figure 2:
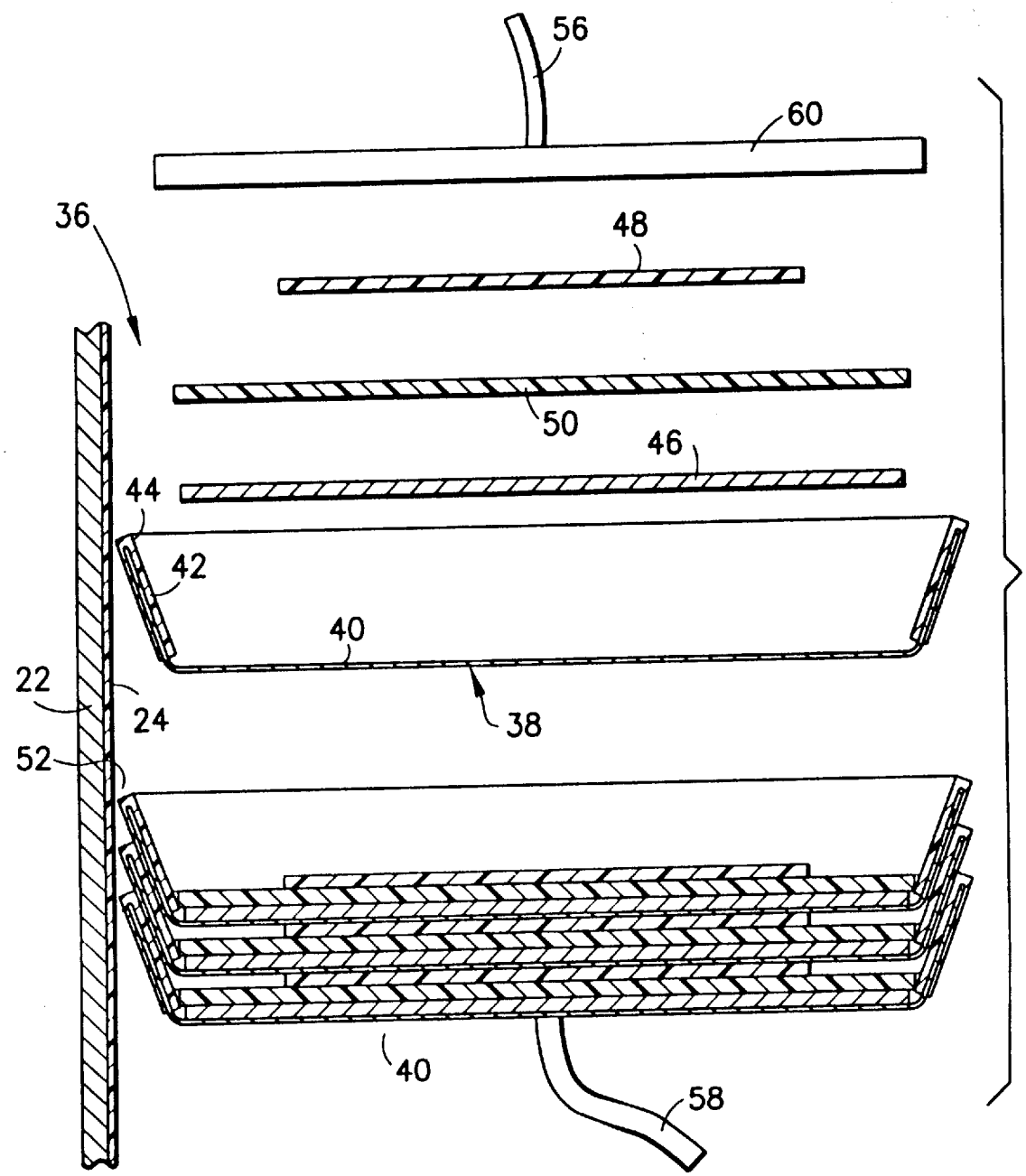
FIG. 2 is a diagrammatic cross section view, partially exploded, illustrating the construction of a plurality of bipolar cells utilized in the battery of FIG. 1.

As shown in FIGS. 1 and 2, a plurality of cells 36 are suitably mounted within the vessel, specifically within the central cylinder 22 in a nested relationship. Each cell 36 contains a metered predetermined quantity of electrolyte and includes a metallic bipolar cup or dish 38 having a base 40 and an integral upstanding upwardly and outwardly tapered side wall 42 encompassing the base. The upstanding side wall is of truncated conical shape diverging with increased distance from the base.

The essential novelty of the present invention resides in the hydrophobic insulating coating 44, shown in FIG. 2, which covers the interior and exterior surfaces of the tapered wall 42 of each dish 38, including the peripheral rim thereof, so as to insulate the wall 42 of each of the bipolar metallic dishes 38 from each other when the dishes 38 are nested into contact with each other to form the cells 36.

It is critical that the insulation coatings 44 are strongly bonded to the metallic tapered walls 42 and remain strongly bonded during an extended lifetime of use under the conditions which exist within the battery 20, namely highly caustic electrolyte (KOH, pH=14+) and electrochemical and thermal stresses.

The present insulation coating materials which meet these requirements are polymers of chlorofluoro olefin monomers, preferably chlorotrifluoro ethylene, and most preferably co-polymers of such monomers with olefin monomers, preferably ethylene.

The metallic bipolar cup 38 may be fabricated from a variety of materials including nickel, aluminum plated with nickel, stainless steel, metallic coated graphite composite and titanium.

A condensed phase electrode 46 is positioned proximate the base. The condensed phase electrodes typically used for the purposes of the present invention are typically 84% porous 0.1 cm thick sintered nickel supported on a nickel screen and electrochemically loaded to between 1.0 and 2.5 g/cm$^3$ of void volume with active Ni(OH)$_2$. This is a standard aerospace positive electrode although it is understood that a variety of nickel positive electrodes could be employed. In particular a sintered nickel electrode without a support screen would be preferred as the screen is not needed for current conduction in a bipolar battery.

Overlying the condensed phase electrode 46 is a smaller-diameter gas electrode 48 including a condensed current collector for a gaseous active material. The gas electrode is typically platinum powder or platinized carbon powder bonded with TEFLON® and supported on carbon cloth or expanded metal. The gas electrode must be conductive through its thickness and, to this end, has no hydrophobic wet proofing porous TEFLON® layer. Back side hydrophobicity is still required in order that the electrolyte solution not flood the pores of the negative electrode. This is achieved by the vendor of the gas electrode 48 using a proprietary hydrophobic carbon coating on the gas side of the electrode. It will be appreciated that the gas electrode 48 is a solid current collector for a gaseous active material and is undercut in size such that it does not engage the dish side wall 42. Any gas generated at the condensed phase electrode 46 must pass through the gas electrode to escape the cell 36.

Intermediate the gas electrode 48 and the condensed phase electrode 46 is a dielectric double separator pair 50. One form of the separator employed for purposes of the invention is ZrO$_2$ woven cloth approximately 80% porous and 0.06 cm thick. However, other suitable materials could be used to achieve a similar result. The separator acts to electrically insulate the opposing electrodes but allows ionic conduction between the electrodes via the liquid electrolyte which fills the pores of the separator.

The upstanding side walls 42 of adjacent cells 36 are oriented such that they mutually define a gap 52, shown in FIG. 2, enabling gas communication between the adjacent cells and between each of the cells and the interior bulk gas region 34 within the battery 20. As previously noted, an insulating liner 24 is provided on the inner surface of the vessel for assuring its fluid integrity.

Each cell is assembled by laying the components up in the metallic bipolar cup in the order illustrated in FIGS. 1 and 2. Once the condensed phase electrode 46 and dielectric separator 50 are in place, sufficient electrolyte is introduced to the cup to fill between 60% and 100% of the porous volume of the condensed phase electrode and separator. The electrolyte for this battery is typically a mixture of KOH and LiOH in water with weight percent between 15% and 45% of KOH and 0% and 20% of LiOH. After electrolyte introduction, assembly is completed by laying the gas electrode 48 in the metallic cup. The gas electrode 48 is smaller in diameter than the condensed phase electrode 46 to avoid any short circuiting between the peripheries thereof. Battery assembly consists of repetitively stacking cells in series to achieve the desired cell count and battery voltage. The stacked cells are placed in the vessel defined by the central cylinder 22 and end caps 26, 28 which together constitute a pressure vessel, compressed to a predetermined value and design stack height, bus leads 56 (negative) and 58 (positive) from the electrodes 60, 40, respectively, are attached to the battery terminals, and the vessel closed.

The preferred insulating coatings 44 for use according to the present invention are melt processable co-polymers of chlorotrifluoro ethylene and ethylene in substantially equimolar amounts, commercially available as mica-containing suspensions in a volatile organic vehicle under the trademark DYKOR.®

The co-polymer is formed as a powder and is suspended in a volatile vehicle, and a lamelliform heat-resistant filler, such as mica, preferably is added. The interior and exterior surfaces of each plate wall 42 are mechanically roughened, cleaned and coated with the suspension and then heated to an elevated temperature to evaporate the volatile vehicle and to heat-fuse the polymer particles to form the impervious insulating coating 44. Preferably two coatings are applied in a thickness of approximately 0.004" per coat.

While the preferred embodiment of the invention has been disclosed in detail, it should be understood by those skilled in the art that various other modifications may be made to the illustrated embodiment without departing from the scope of the invention as described in the specification and defined in the appended claims.

What is claimed is:

1. A bipolar cell for a gas depolarized rechargeable battery comprising:

an electrically conductive bipolar plate having a base and an upwardly and outwardly tapered peripheral wall,;

a hydrophobic insulating coating comprising a chlorofluoro olefin polymer bonded to the interior and exterior surfaces of said peripheral wall;

a condensed phase electrode proximate said base;

a gas electrode including a condensed current collector for a gaseous active material; and a dielectric separator between said condensed phase electrode and said gas electrode;

said insulating coating being oriented to enable gas passage from said cell past an adjoining cell to a bulk gas storage region within the battery.

2. A bipolar cell as set forth in claim 1 wherein said insulating coating comprises a co-polymer of ethylene and chlorotrifluoro ethylene.

3. A bipolar cell as set forth in claim 2 in which said insulating coating contains mica filler.

4. A bipolar rechargeable battery comprising:

a vessel having an inner surface defining an interior region for bulk gas storage;

a plurality of cells mounted within said vessel in a side by side relationship, each of said cells containing a metered predetermined quantity of electrolyte, each of said cells including:

an electrically conductive bipolar base having an upwardly, outwardly tapered peripheral wall;

a hydrophobic insulating coating comprising a chlorotrifluoro olefin polymer bonded to the interior and exterior surfaces of said peripheral wall;

a condensed phase electrode proximate said base; and a gas electrode including a condensed current collector for a gaseous active material;

a dielectric separator between said condensed phase electrode and said gas electrode;

said insulating coating of said plurality of cells being oriented to enable gas passage from each of said cells to the bulk gas region within the battery.

5. A bipolar rechargeable battery as set forth in claim 4 including:

an insulating liner on said inner surface of said vessel to prevent electrolyte solution bridging between said cells via the wall of said vessel.

6. A bipolar cell for a gas depolarized rechargeable battery comprising:

a metallic bipolar plate having a base and an integral upwardly, outwardly tapered side wall encompassing said base;

a hydrophobic insulating coating comprising a chlorotrifluoro olefin polymer bonded to the interior and exterior surfaces of said upstanding side wall;

a condensed phase electrode overlying said base;

a gas electrode including a condensed current collector for a gaseous active material; and a dielectric separator between said condensed phase electrode and said gas electrode;

said upstanding side wall being oriented to enable gas passage from said cell past an adjoining cell to a bulk gas storage region within the battery.

7. A bipolar cell as set forth in claim 6 wherein said upstanding side wall is of truncated conical shape diverging with increased distance from said base;

whereby said upstanding side wall of said cell and an adjacent upstanding side wall of an adjacent cell together define a gap enabling gas communication between said cell and the adjacent cell and between each of said cell and the adjacent cell and a bulk gas storage region with the battery.

8. A bipolar cell as set forth in claim 6 in which said insulating coating comprises a copolymer of ethylene and chlorotrifluoro ethylene.

9. A process for producing an insulated bipolar plate for a gas depolarized rechargeable battery, said plate having a conductive base having an upwardly, outwardly tapered peripheral wall integral with said base, comprising the steps of applying to the interior and exterior surfaces of said wall a continuous coating of a particulate chlorofluoro olefin polymer, and heating said coating to an elevated temperature to fuse said particles and form a continuous hydrophobic coating bonded to said wall.

10. A process according to claim 9 in which said olefin polymer comprises chlorotrifluoro-ethylene.

11. A process according to claim 9, in which said olefin polymer is a co-polymer of ethylene and chlorotrifluoro-ethylene.

12. A process according to claim 9 in which said olefin polymer is applied as a suspension of particles in a volatile organic vehicle.

13. A process according to claim 9 in which said olefin polymer comprises mica filler.

* * * * *